J. GALLAGHER.
Cooking Apparatus.

No. 107,477. Patented Sept. 20, 1870.

WITNESSES:
Chas H Poole
W. J. Ketcham

INVENTOR:
John Gallagher
By J. B. Woodruff & Son
Attorneys

United States Patent Office.

JOHN GALLAGHER, OF CLEVELAND, OHIO.

Letters Patent No. 107,477, dated September 20, 1870.

IMPROVEMENT IN COOKING APPARATUS.

The Schedule referred to in these Letters Patent and making part of the same.

*To all whom it may concern:*

Be it known that I, JOHN GALLAGHER, of Cleveland, in the county of Cuyahoga and State of Ohio, have invented a certain new and useful Improvement in Cooking Apparatus, a combined pot-lid and seething-pot, or adjustable steam cooking apparatus; and the following is a full, clear, and exact description of the same, reference being had to the accompanying drawing making a part of this specification, in which—

Figure 1:
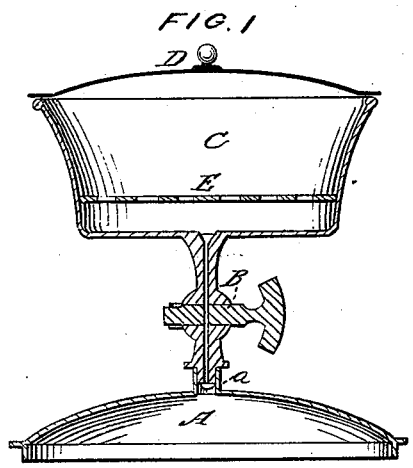
Figure 1 represents a sectional view of my invention.
Figure 2:
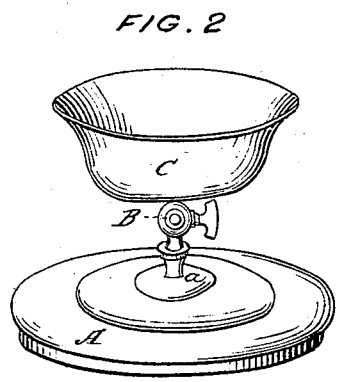
Figure 2 shows a perspective view of the same.

The object of my invention is to secure a greater economy of time and fuel in cooking meats and vegetables, (especially in the summer season,) and, at the same time, retain all of the flavor and nutriment of the articles being cooked, which are lost and wasted in a greater or lesser degree by the ordinary processes of cooking.

My invention consists in attaching to the central portion of a pot-lid, and combining therewith, an ordinary stop-cock, on the top of which is secured a seething-pan or pot, for placing any article in to be cooked by the action of steam, or stewing by a slow process.

To enable others to make and use my improvements I will describe them more fully, referring to the drawing, &c.

A is an ordinary sheet-metal pot-lid, it being provided with an opening and short tube, $a$, in the center, into which is fitted a stop-cock, B, on the top of which is secured a vessel or pot, C, of any suitable material, and may be made of any desired form or dimensions, and is provided with a lid or cover, D, so fitted as to be nearly tight, to prevent the escape of steam, or vapor.

The vessel C may be provided with one or more diaphragms, or open-work supports, E, on which to place the articles, so that the steam or heat may have access to both top and bottom.

By the arrangement of the stop-cock B, the supply of steam and heat may be regulated in the vessel or pot C, so that the seething process may be fast or slow, as the nature of the article requires, and if desired, the steam can be wholly shut off, and the cooked food be kept hot and moist for any desired length of time, without the loss of any of its properties.

For apple-dumplings, and many things in the dessert line required to be kept hot, my device, as above described, has great advantages over others that have yet come to my knowledge, and, for cooking most kinds of fresh meats, and fish, there is no mode of cooking that will make them so tender and nutritious as seething, in the manner as above described; and for stewing berries and fruits, for preserving, which require a careful and slow process of heating, and which are often injured and spoiled by overheating, the device, as above described, possesses many advantages, as there is no risk of their being burned by neglect, and the process can be going on at the same time that other operations are being performed, without additional heat.

What I claim as my invention, and desire to secure by Letters Patent, is—

The combination of the seething apparatus or vessel C, stop-cock B, and pot-lid A, for cooking purposes, all constructed to operate substantially in the manner as herein shown and described.

In testimony whereof I hereunto subscribe my name in the presence of—

JOHN GALLAGHER.

Witnesses:
ISEDORE ROSKOPH,
F. G. ROEDER.